(12) United States Patent
Povinelli et al.

(10) Patent No.: US 11,034,395 B2
(45) Date of Patent: *Jun. 15, 2021

(54) ACTIVE FRONT DEFLECTOR

(71) Applicant: Magna Exteriors Inc., Concord (CA)

(72) Inventors: Anthony J. Povinelli, Romeo, MI (US); Martin R. Matthews, Troy, MI (US); Jeffrey B. Manhire, Rochester, MI (US)

(73) Assignee: MAGNA EXTERIORS, INC, Concord (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/158,556

(22) Filed: Oct. 12, 2018

(65) Prior Publication Data
US 2019/0084628 A1 Mar. 21, 2019

Related U.S. Application Data

(63) Continuation of application No. 15/318,117, filed as application No. PCT/US2015/035084 on Jun. 10, (Continued)

(51) Int. Cl.
*B62D 35/00* (2006.01)
*B65D 35/02* (2006.01)
(Continued)

(52) U.S. Cl.
CPC ........... *B62D 35/005* (2013.01); *B62D 35/02* (2013.01); *B62D 37/02* (2013.01); *B60Y 2300/52* (2013.01); *B60Y 2400/411* (2013.01); *Y02T 10/82* (2013.01)

(58) Field of Classification Search
CPC ...... B62D 35/00; B62D 35/005; B62D 35/02; B62D 37/02; B62D 25/166; B60R 3/02;
(Continued)

(56) References Cited

U.S. PATENT DOCUMENTS 4,159,140 A * 6/1979 Chabot ................ B62D 35/005
296/180.5
4,489,806 A * 12/1984 Shimomura ......... B62D 35/005
180/313

(Continued)

OTHER PUBLICATIONS

Canadian Office Action for Application No. 2,951876, dated Sep. 1, 2020.

*Primary Examiner* — Gregory A Blankenship
(74) *Attorney, Agent, or Firm* — Warn Partners, P.C.

(57) ABSTRACT

An active front deflector assembly having a deployable deflector panel, linkage assemblies, and an actuator. The system deploys and retracts based on vehicle requirements, and, when deployed, interrupts air flow thereby improving the vehicle aerodynamics, reducing emissions and improving fuel economy. The deflector panel is retractable so the vehicle meets ground clearances, ramp angles, off-road requirements, etc. The deflector panel is also both rigid and semi-rigid to absorb impact energy. The linkage assemblies are coupled to the deflector panel and a drive shaft connected to the actuator. The drive shaft transmits the drive from the actuator coupled to one linkage assembly to the other linkage assembly for moving the deflector panel between the deployed/retracted positions. The actuator is clutched to prevent damage to the system. The active front deflector assembly provides a fully deployable system with object detection, declutching of the actuator, and communication with the vehicle.

58 Claims, 9 Drawing Sheets

Related U.S. Application Data 2015, now Pat. No. 10,124,839, which is a continuation of application No. 14/899,729, filed as application No. PCT/US2014/043185 on Jun. 19, 2014, now Pat. No. 10,274,027.

(60) Provisional application No. 62/010,825, filed on Jun. 11, 2014, provisional application No. 61/836,936, filed on Jun. 19, 2013.

(51) Int. Cl.
  *B62D 37/02* (2006.01)
  *B62D 35/02* (2006.01)

(58) Field of Classification Search
  CPC ........... B60Y 2300/52; B60Y 2400/411; Y02T 10/82
  USPC ...................................................... 296/180.5
  See application file for complete search history.

(56) References Cited

U.S. PATENT DOCUMENTS

| | | | | |
|---|---|---|---|---|
| 4,582,351 A * | 4/1986 | Edwards | ................ | B60R 19/56 293/102 |
| 4,659,130 A * | 4/1987 | Dimora | ............... | B62D 35/005 296/180.1 |
| 4,904,016 A * | 2/1990 | Tatsumi | ............... | B62D 35/005 296/180.5 |
| 4,951,994 A * | 8/1990 | Miwa | .................. | B62D 35/005 296/180.1 |
| 5,485,391 A * | 1/1996 | Lindstrom | ......... | G05B 19/4065 700/175 |
| 5,769,177 A * | 6/1998 | Wickman | ................ | B60L 58/21 180/65.22 |
| 5,842,709 A * | 12/1998 | MacCabee | ................ | B60R 3/02 280/166 |
| 6,149,172 A * | 11/2000 | Pascoe | .................. | B60R 3/02 280/163 |
| 6,149,544 A * | 11/2000 | Masberg | .................. | B60K 6/26 477/13 |
| 6,184,603 B1 * | 2/2001 | Hamai | ..................... | B60K 6/26 310/75 R |
| 6,322,221 B1 * | 11/2001 | van de Loo | ............ | B60R 1/074 359/841 |
| 6,325,397 B1 * | 12/2001 | Pascoe | ..................... | B60R 3/02 280/163 |
| 6,886,883 B2 * | 5/2005 | Jacquemard | ......... | B62D 35/005 296/180.5 |
| 7,374,299 B2 * | 5/2008 | Brouwer | ................ | B60R 1/074 359/841 |
| 7,481,482 B2 * | 1/2009 | Grave | .................. | B62D 35/007 296/180.5 |
| 7,775,582 B2 * | 8/2010 | Browne | ............... | B62D 35/005 296/180.1 |
| 7,780,223 B2 * | 8/2010 | Kottenstette | ......... | B62D 35/005 296/180.1 |
| 8,186,746 B2 * | 5/2012 | MacKenzie | ............. | B60R 19/40 296/180.5 |
| 8,366,284 B2 * | 2/2013 | Flynn | ...................... | B60R 1/076 359/841 |
| 8,702,152 B1 * | 4/2014 | Platto | ................... | B62D 35/005 296/180.1 |
| 8,887,845 B2 * | 11/2014 | McDonald | ........... | B62D 35/005 180/68.1 |
| 9,021,801 B2 * | 5/2015 | Gao | .......................... | F01P 7/10 60/528 |
| 9,039,068 B2 * | 5/2015 | Niemi | .................... | B62D 35/02 296/180.1 |
| 9,150,261 B2 * | 10/2015 | DeAngelis | ............ | B62D 35/02 |
| 9,677,313 B2 * | 6/2017 | Nishikibe | ............... | E05F 15/40 |
| 9,950,754 B2 * | 4/2018 | Povinelli | ............... | B62D 35/02 |
| 9,956,998 B2 * | 5/2018 | Zielinski | ............... | B62D 35/005 |
| 10,124,839 B2 * | 11/2018 | Povinelli | ............... | B62D 35/005 |
| 10,266,214 B2 * | 4/2019 | Cha | ......................... | B60R 19/48 |
| 10,351,182 B2 * | 7/2019 | Zielinski | ............... | B62D 35/02 |
| 10,377,428 B2 * | 8/2019 | Povinelli | ............... | B62D 35/02 |
| 10,435,084 B2 * | 10/2019 | Povinelli | ............... | B62D 37/02 |
| 10,450,013 B2 * | 10/2019 | Cha | ....................... | B62D 35/005 |
| 2003/0132595 A1 * | 7/2003 | Fabiano | .................. | B60R 3/002 280/166 |
| 2003/0184040 A1 * | 10/2003 | Leitner | ..................... | B60R 3/02 280/166 |
| 2005/0161577 A1 * | 7/2005 | French | ..................... | H02K 5/00 248/672 |
| 2006/0010771 A1 * | 1/2006 | Houser | .................... | E05F 15/63 49/341 |
| 2006/0081800 A1 * | 4/2006 | Riester | ..................... | H02K 7/14 251/129.01 |
| 2007/0063541 A1 * | 3/2007 | Browne | ................. | B62D 35/00 296/180.1 |
| 2008/0284265 A1 * | 11/2008 | Chaohai | .................. | H02K 5/10 310/89 |
| 2010/0140976 A1 * | 6/2010 | Browne | ............... | B62D 35/005 296/180.1 |
| 2011/0238273 A1 * | 9/2011 | Holland | ............... | F16H 61/2807 701/58 |
| 2012/0330513 A1 * | 12/2012 | Charnesky | ............ | G01S 13/931 701/48 |
| 2014/0150581 A1 * | 6/2014 | Scheuring | ............ | E05F 15/622 74/89.38 |
| 2015/0084369 A1 * | 3/2015 | Niemi | .................... | B62D 35/02 296/180.1 |
| 2016/0229467 A1 * | 8/2016 | Miller | .................. | B62D 35/005 |
| 2017/0101136 A1 * | 4/2017 | Zielinski | ............... | B62D 35/005 |
| 2017/0106922 A1 * | 4/2017 | Povinelli | ............... | B62D 35/005 |
| 2017/0120968 A1 * | 5/2017 | Povinelli | ............... | B62D 35/005 |
| 2017/0137074 A1 * | 5/2017 | Miller | .................. | B62D 35/005 |
| 2019/0084628 A1 * | 3/2019 | Povinelli | ............... | B62D 35/005 |
| 2019/0152543 A1 * | 5/2019 | Shiga | ..................... | B62D 37/02 |
| 2019/0248429 A1 * | 8/2019 | Parra | .................. | B62D 35/005 |
| 2019/0283814 A1 * | 9/2019 | Zielinski | ............... | B62D 37/02 |

* cited by examiner

ACTIVE FRONT DEFLECTOR

CROSS-REFERENCE TO RELATED APPLICATIONS

This application is a Continuation of National Stage Application No. 15/318,117, filed Dec. 12, 2016, which is a Continuation of National Stage Application No. 14/899,729, filed Dec. 18, 2015, which is a National Stage of PCT/US2015/035084, filed Jun. 10, 2015, which claims priority benefit to U.S. Provisional Application No. 62/010,825, filed Jun. 11, 2014 and National Stage Application No. PCT/US2014/043185, filed Jun. 19, 2014, which claims priority benefit to U.S. Provisional Application No. 61/836,936, filed Jun. 19, 2013. The disclosures of the above applications are incorporated herein by reference.

FIELD OF THE INVENTION

The present invention relates to a panel structure of an active front deflector system for automotive applications.

BACKGROUND OF THE INVENTION

There is a considerable loss of aerodynamic efficiency in vehicles, in particular, due to the airflow underneath and around a vehicle. Conventional structures, such as fixed panels or fixed air deflectors/dams using flexible materials, are known and do not meet desired requirements, including, but not limited to, conventional structures do not provide an effective sealed and clutchable actuator with communication capability and life cycle durability, a system that is capable of object detection, or a system that is durable and aerodynamically effective. These fixed air deflector/dams are still a compromise as they cannot be made to the optimum height without compromising specifications and comparisons to other vehicle capabilities. Further, these air dams even when flexible are still damaged during off-roading or when added ground clearance is needed.

Another known problem is that vehicle aerodynamics are compromised by design to accommodate a wide range of driving conditions. One of these is the vehicle ground clearance, from low speed maneuvering (multi-story parking lots, speed bumps, ramps, etc.) to off-road capabilities of trucks and sport utility vehicles. These conditions only account for a small portion of the vehicle life, resulting in compromised vehicle aerodynamics for the majority of miles driven.

Accordingly, there is a long felt need for an active front deflector that provides improved aerodynamics when deployed, but is retractable when low speed maneuvering or off road capabilities are required.

SUMMARY OF THE INVENTION

There is provided an aerodynamic surface which improves aerodynamics when deployed and is retractable out of the way to return the vehicle to its initial design intent. The present invention is directed to an active front deflector assembly having at least one actuator and at least one deflector panel coupled to at least one linkage assembly. The active front deflector assembly is retractable so that it does not compromise the vehicle capabilities for conditions such as during off roading or when added ground clearance is needed, and is deployable for normal driving conditions. When in the extended or deployed position, the deflector panel improves airflow under predetermined conditions. When in the retracted or stowed position, the deflector panel generally moves or folds out of the way toward under the vehicle to improve ground clearance.

The active front deflector assembly provides a fully deployable system with object detection, declutching to help prevent damage, e.g., to protect the deflector panel under higher predetermined loads, communication with the vehicle to determine proper deployment and function, and is suitable to meet automotive specifications and functionality. Utilizing the active front deflector system that deploys and retracts based on predetermined vehicle requirements provides valuable reduction in vehicle drag, thereby reducing emissions and improving fuel economy. Additionally, it allows for the system to retract so the vehicle can still meet ground clearances, ramp angles, off-road requirements, etc.

Motion of the deployable deflector is driven by the linkage assembly and the actuator that is clutchable and that has communication capability with the vehicle, e.g., to prevent damage to the active front deflector system. The deployable deflector panel allows for aerodynamic benefits without limiting the vehicle ground clearance at lower speeds and while off roading or other predetermined conditions. The system does not require manual deployment and is only utilized when necessary under predetermined conditions, e.g., vehicle speeds in the range of at least 30 miles per hour.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Referring to FIGS. 1-6 generally, in accordance with the present invention, there is provided an active front deflector assembly generally movable between a stowed position (or "retracted" position) and a deployed position (or "extended" position) under predetermined conditions. The active front deflector assembly provides an active full air deflector that deploys and retracts based on vehicle requirements. This allows for a deployment lower than fixed panel systems to significantly reduce drag, reduce emissions, improves fuel economy, (and/or improve active grille shutter performance when used in combination with the active front deflector assembly). Additionally, it allows for the system to retract so the vehicle can still meet ground clearances, ramp angles, off-road requirements, etc. In the event of impact while the system is deployed, the actuator allows the system to retract and/or move freely to help prevent damage. These are significant improvements over typical vehicle systems utilizing a fixed sacrificial panel below and/or near the fascia to achieve basic and less effective aerodynamic improvements.

Figure 1:
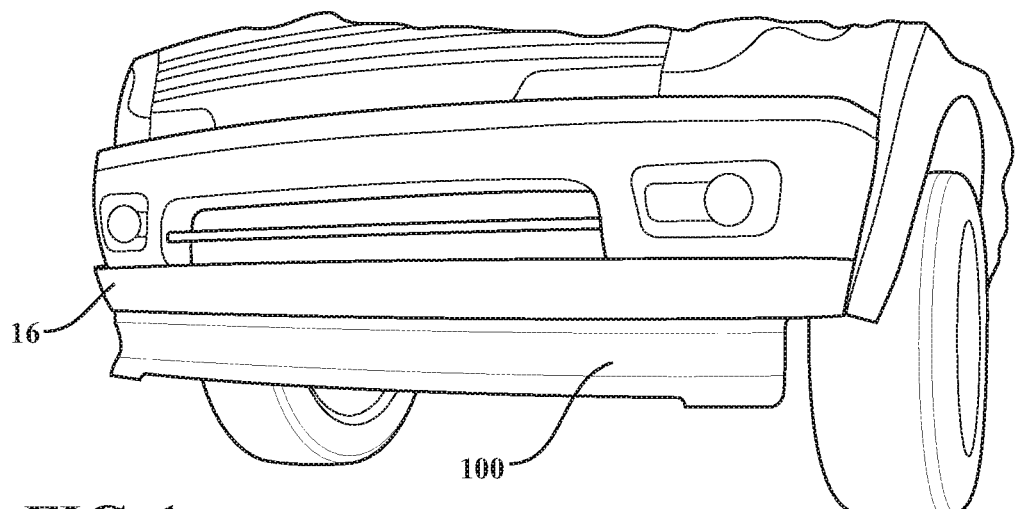
FIG. 1 is a front perspective view a vehicle with an active front deflector assembly in a deployed position, in accordance with the present invention.

FIG. 1 is a perspective view of an active front deflector assembly 100 shown in an environment of use attached to a vehicle 16, in accordance with the present invention. This is typical of the environment and shows the active front deflector assembly 100 in the deployed position, in accordance with the present invention.

Figure 2:
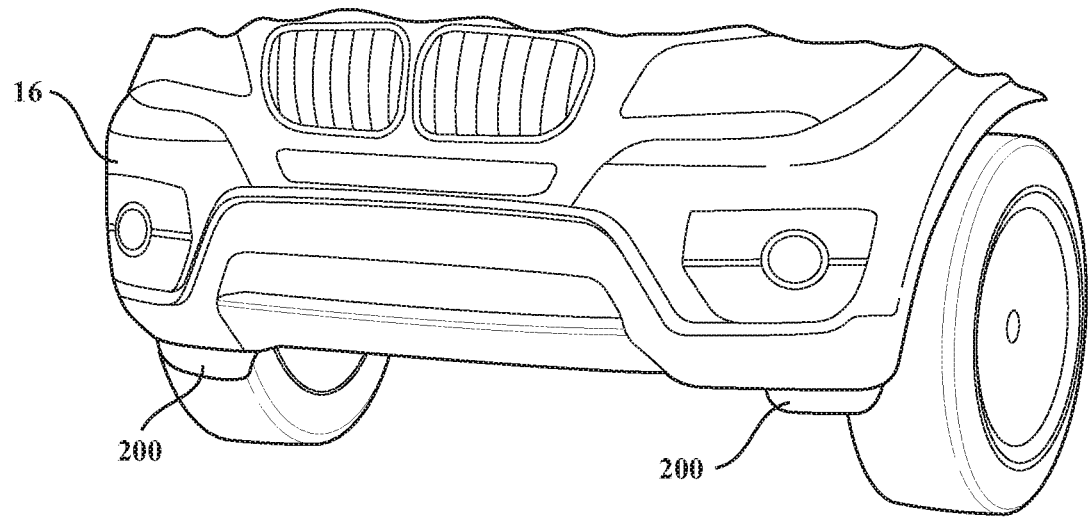
FIG. 2 is a perspective view of a vehicle with an active front deflector assembly having multi-positioning and in the retracted position wherein only the outer edges are exposed to the air flow near the wheels, in accordance with a second embodiment of the present invention.
Figure 3:
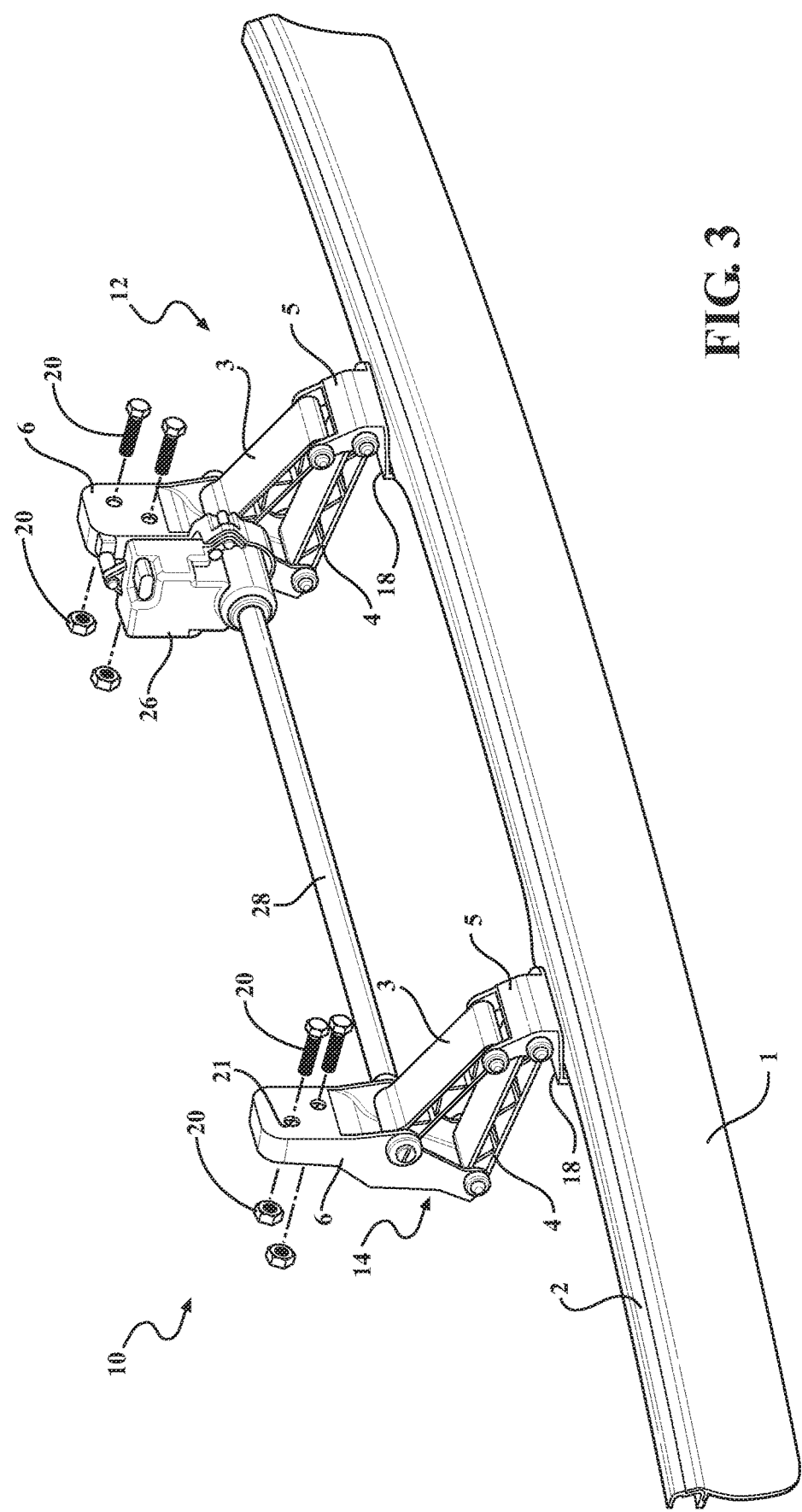
FIG. 3, is a perspective view of an active front deflector assembly shown in a deployed position, in accordance with another embodiment of the present invention.
Figure 4:
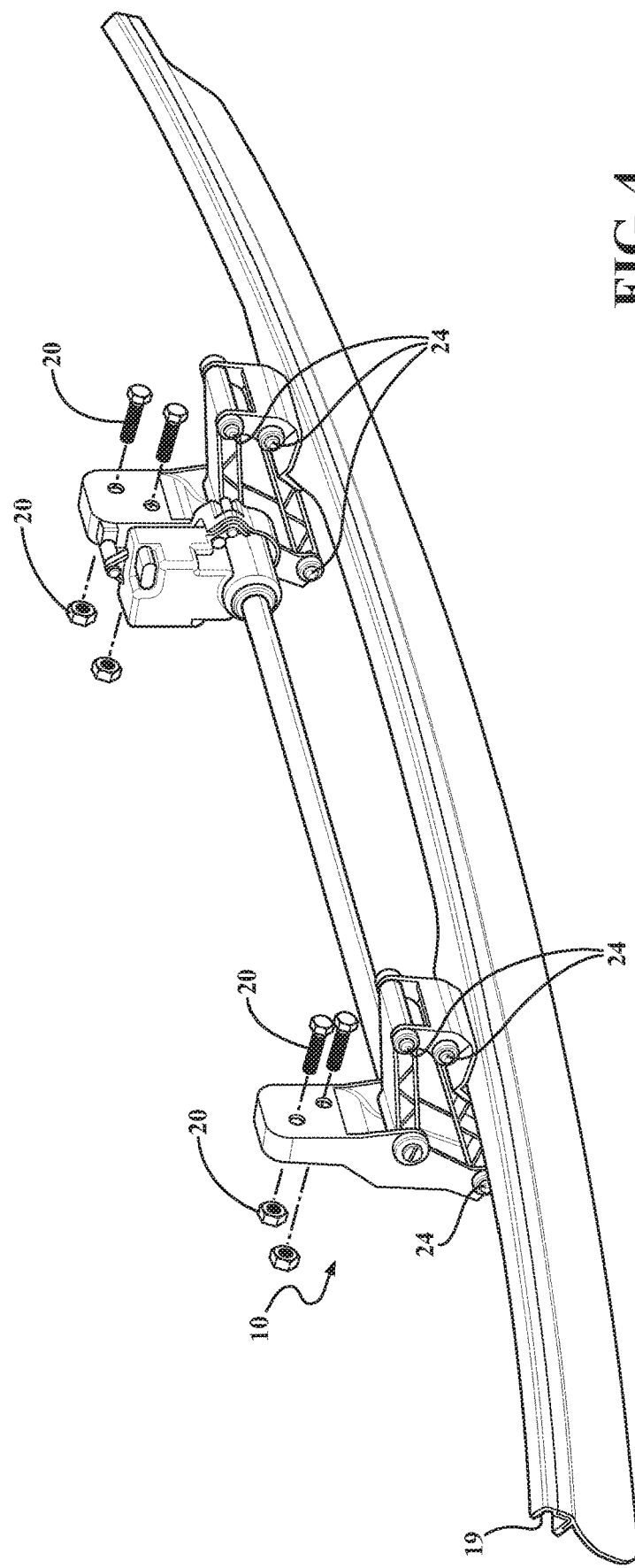
FIG. 4, is a perspective view of the active front deflector assembly of FIG. 3 shown in a retracted position, in accordance with the present invention.
Figure 5:
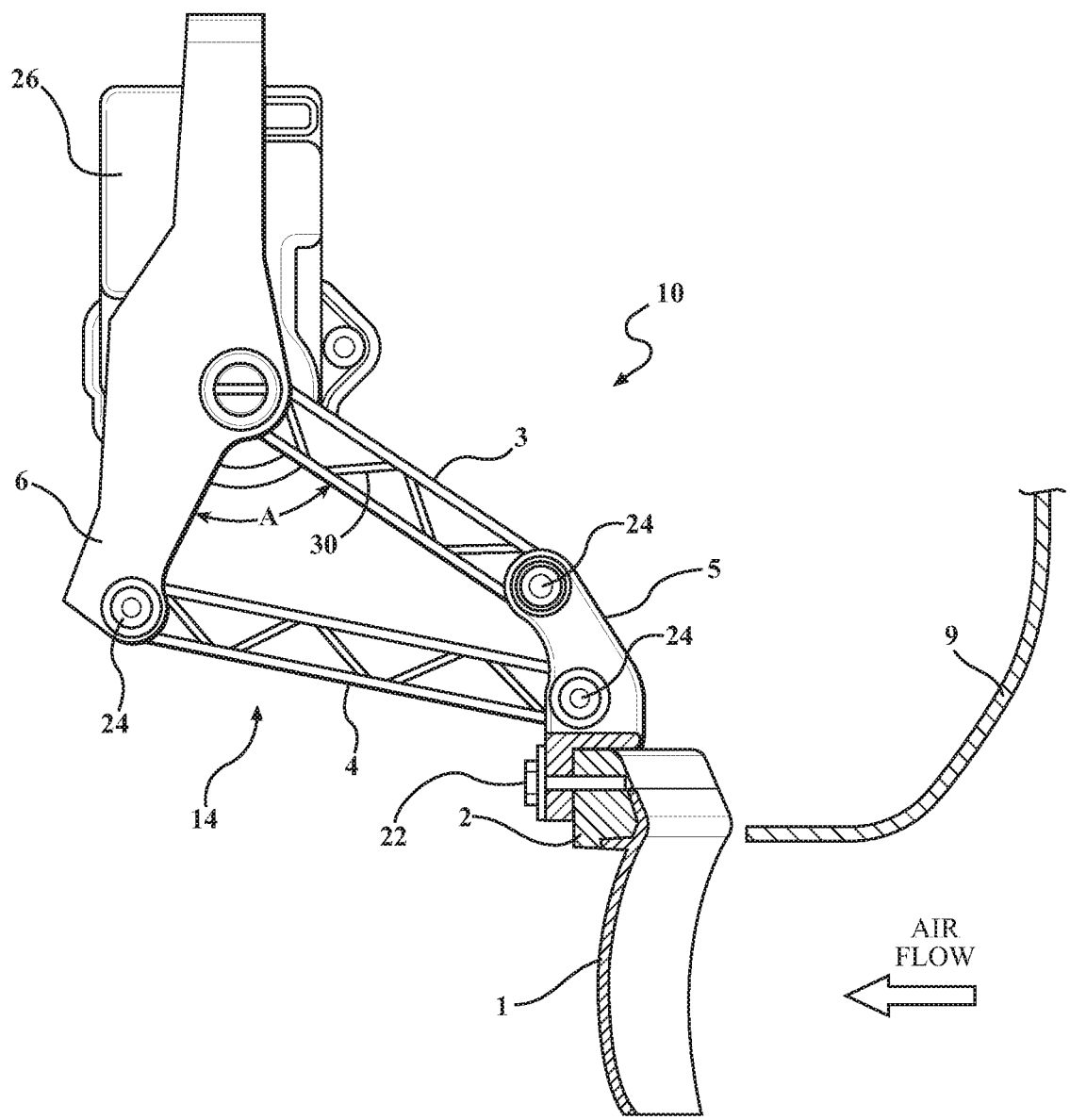
FIG. 5, is an enlarged broken-away side view of the deployed active front deflector assembly of FIG. 3, in accordance with the present invention.
Figure 6:
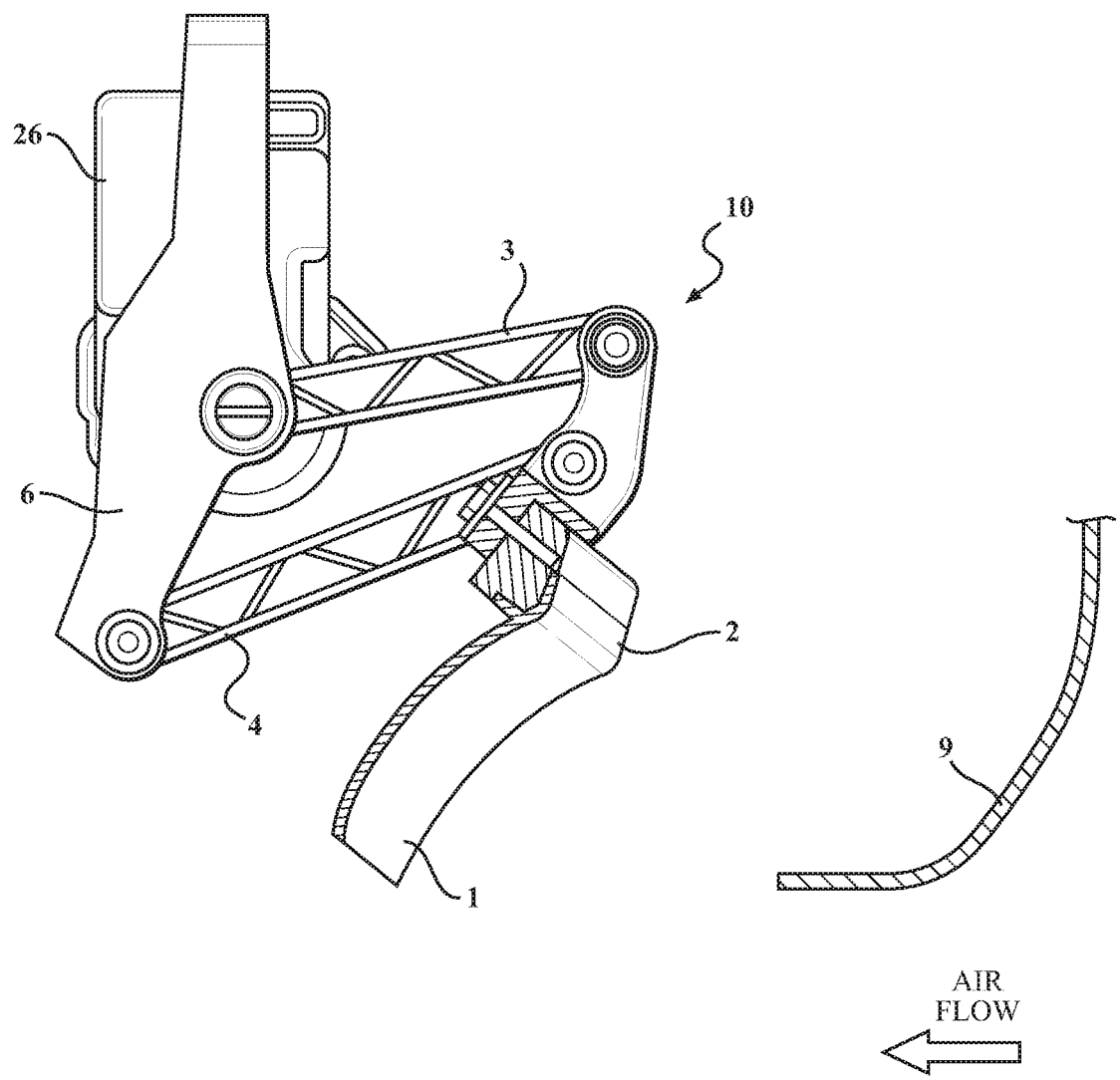
FIG. 6, is an enlarged broken-away side view of the retracted active front deflector assembly of FIG. 4, in accordance with the present invention.
Figure 7:
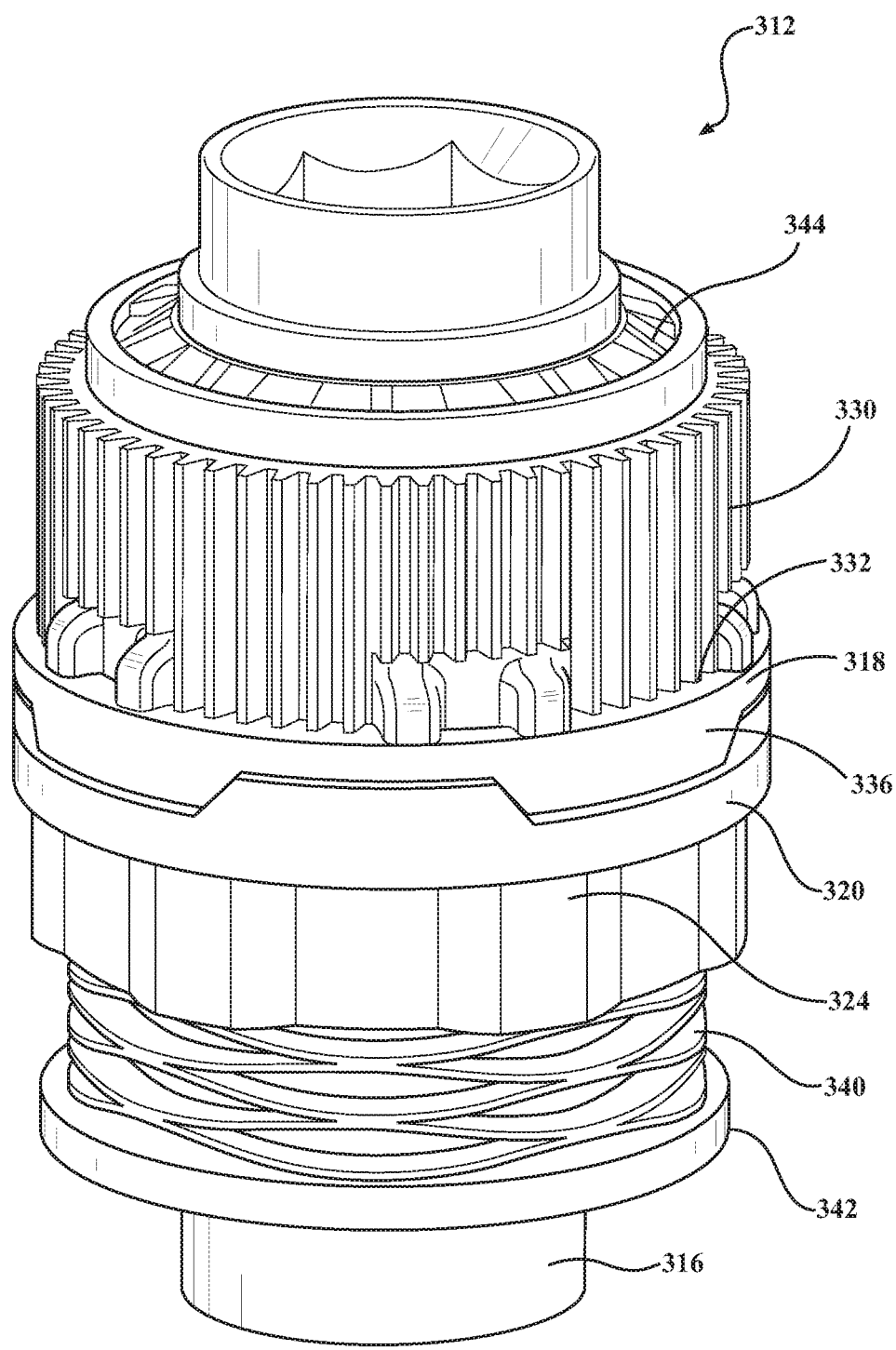
FIG. 7 is a perspective view of an exemplary clutch system for an actuator assembly, in accordance with the present invention.
Figure 8:
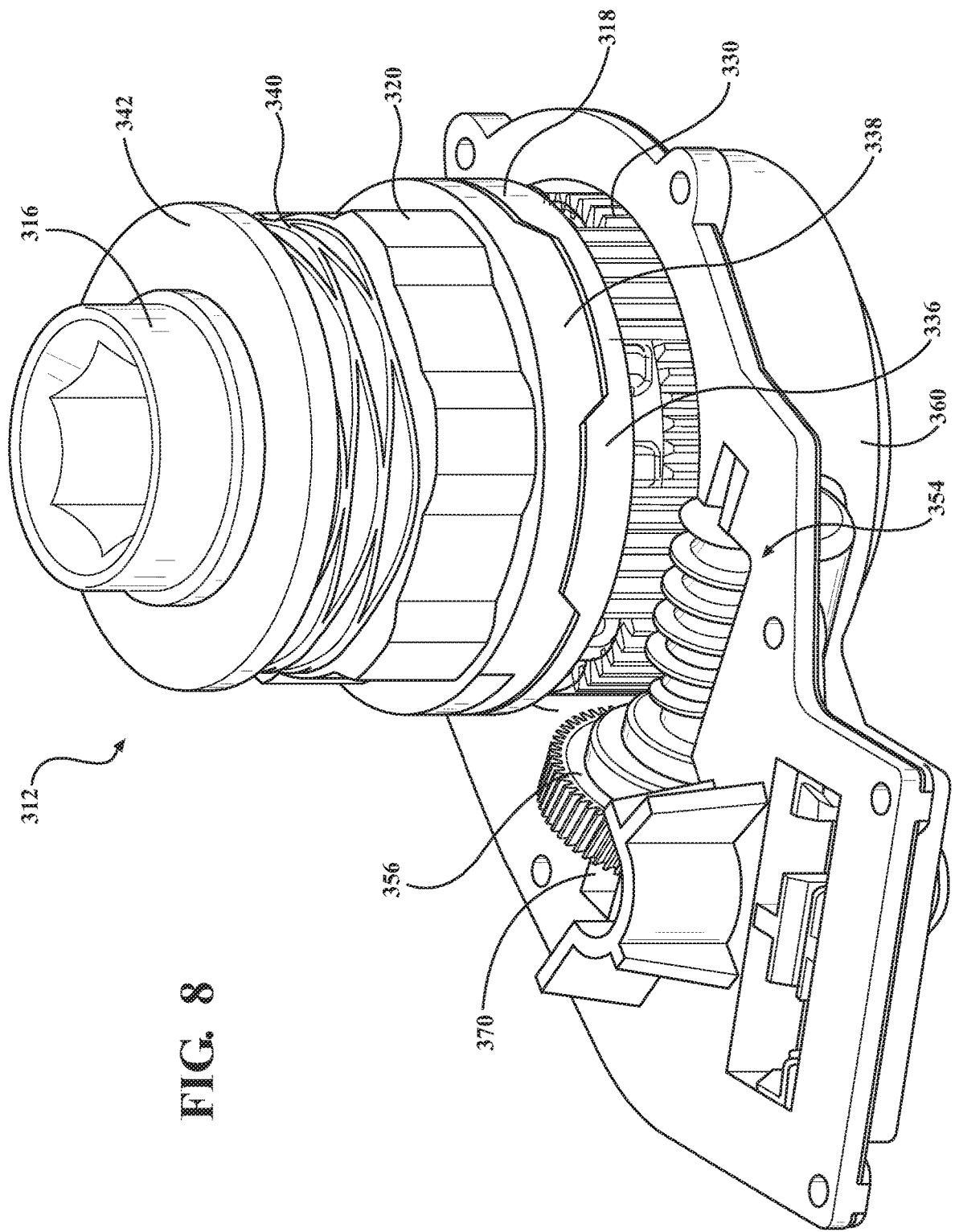
FIG. 8 is a perspective view of an exemplary actuator with internal clutching assembly with a housing and motor arrangement removed for clarity, in accordance with the present invention.
Figure 9:
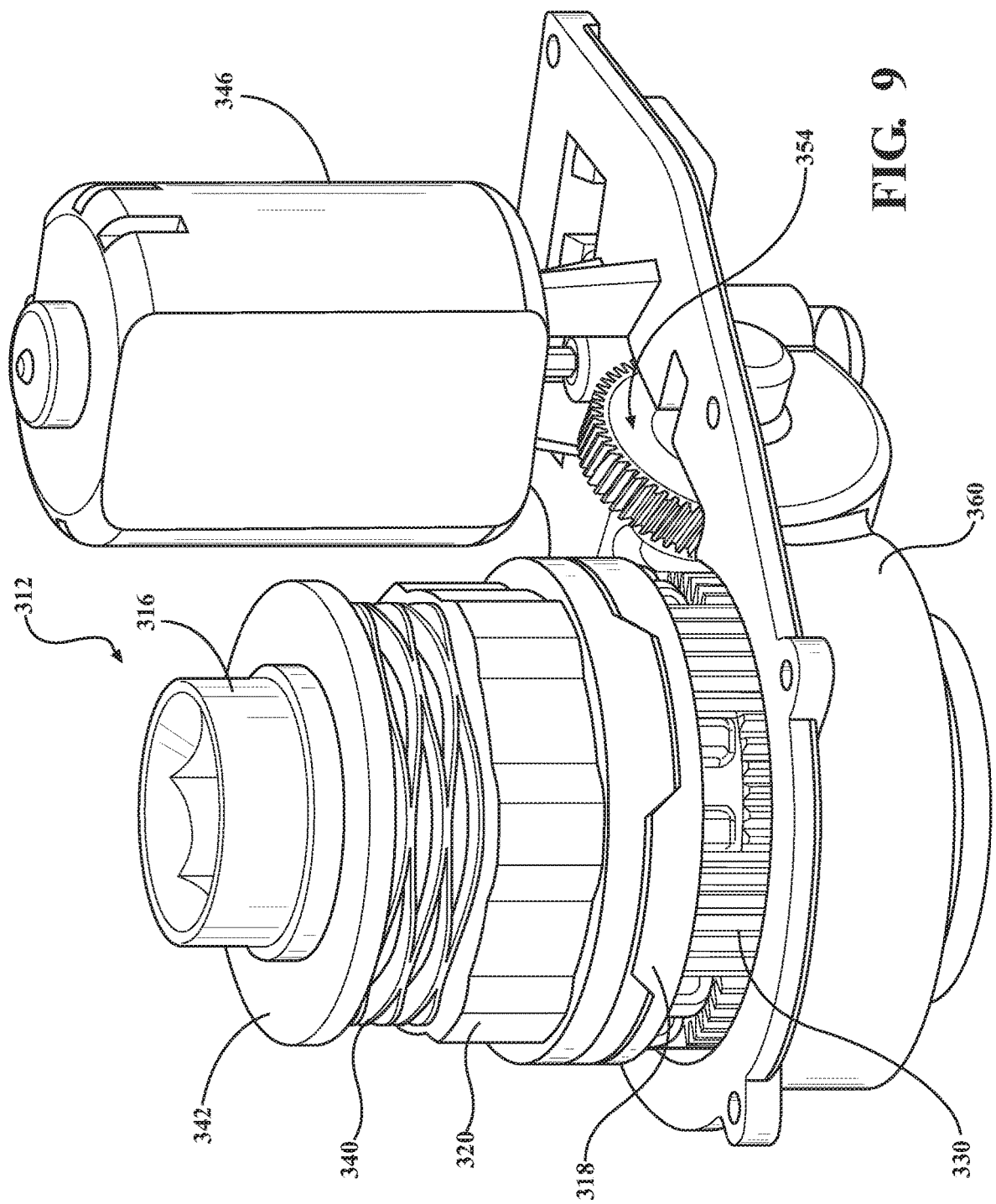
FIG. 9 is a perspective view of the actuator of FIG. 8 without the housing for clarity.
Figure 10:
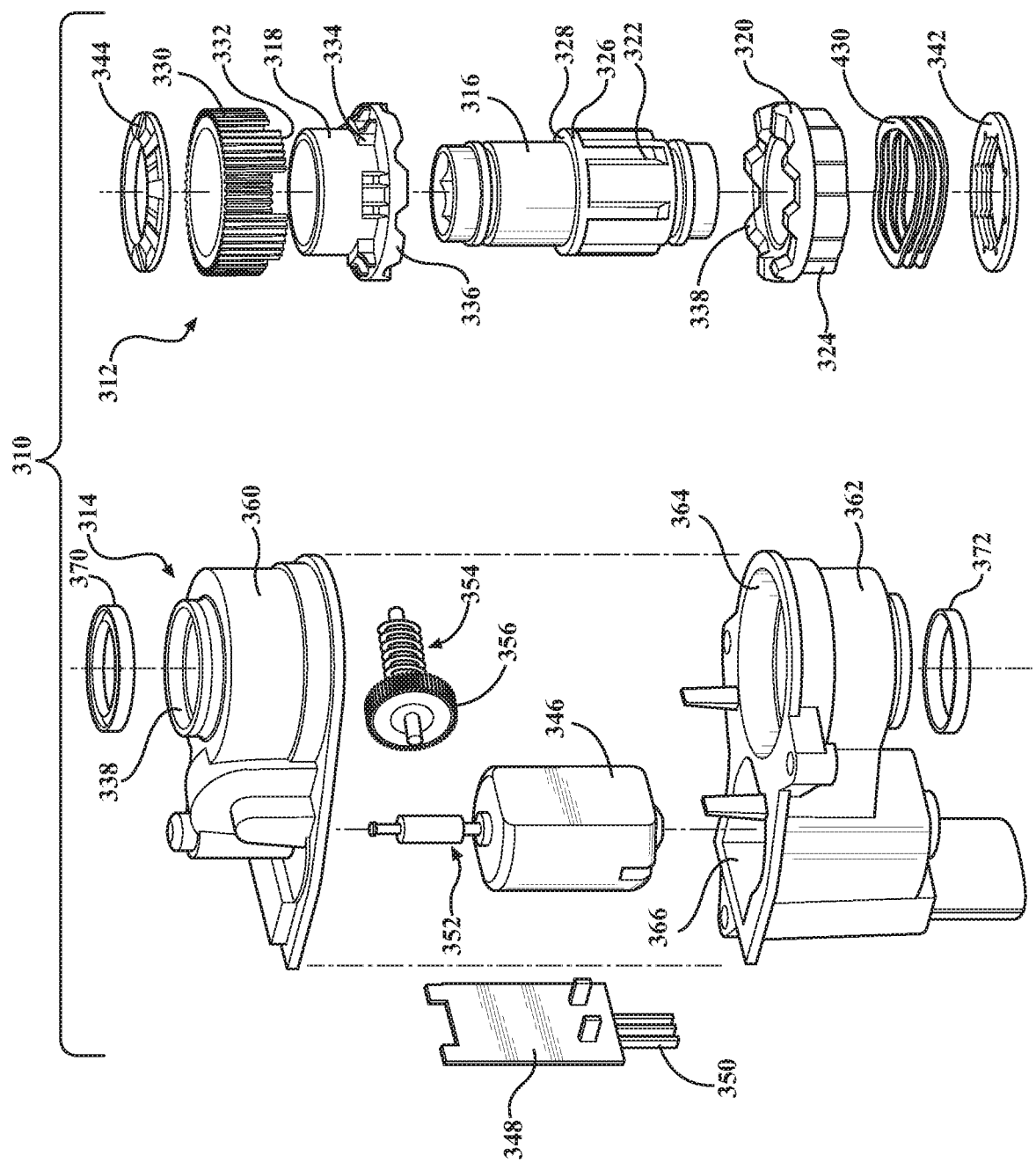
FIG. 10 is an exploded view of the exemplary actuator with internal clutching for deploying/stowing the active front deflector assembly, in accordance with the present invention.

FIG. 2 is a perspective view of another vehicle 16 with an active front deflector assembly having multi-positioning in accordance with another embodiment of the present invention. The active front deflector has at least two deflector panel portions 200 and in the retracted position only these deflector panel portions 200 located at the outer edges are exposed to the air flow in front of the wheels. By way of example, a middle portion spanning between the two end deflector panel portions 200 may be retractable (generally upward) while the two outer edge portions 200 remain deployed and exposed to air flow.

Referring to FIGS. 3-6 generally, in accordance with another embodiment of the present invention, there is provided an active front deflector assembly generally shown at 10 movable between a stowed position (or "retracted" position) and a deployed position (or "extended" position) under predetermined conditions. The active front deflector assembly 10 generally includes at least one deflector panel 1 that is semi-rigid with a rigid upper spine 2 portion. Most preferably, the semi-rigid and rigid portion are integrally formed. The deflector panel 1 is coupled to at least two linkage assemblies generally shown at 12, 14 that are four bar linkages. The two four bar linkage assemblies 12, 14 are operable spaced apart to provide strength, durability, and installation on the vehicle, while preventing binding and allowing smooth transitioning between the deployed and retracted positions.

Each linkage assembly 12, 14 has a drive link 3 and a follower link 4 pivotally connected to a coupler link 5 and pivotally connected to a fixed base link 6. The coupler link 5 also includes a mounting portion 18, e.g., an integrally formed mounting bracket with apertures for receiving fasteners, to operably couple each of the respective linkage assemblies 12, 14 to the deflector panel 1. In this embodiment, there are two linkage assemblies 12, 14 used with each active front deflector assembly 10. However, it is within the scope of the invention that more or less linkage assemblies 12, 14 may be used, depending upon the length of the assembly 10 and particular application.

The assembly 10 is attached to the underside of the vehicle 16 towards the front. The assembly 10 is operably supported and connected to a fascia portion of the vehicle 16, bumper reinforcement, fenders, frame or any other vehicle structure or molding for securing the assembly 10 to the vehicle 16. Each of the linkage assemblies 12, 14 is attached to the vehicle 16 by at least one fastener 20 (FIG. 4), which in this embodiment is a nut and bolt combination, but it is within the scope of the invention that other fasteners, such as rivets, may be used as well. Each fastener 20 extends through a corresponding one of a plurality of first apertures 21 formed as part of an upward portion of the fixed base link 6. Depending on the application, the fixed base link 6 is mounted in front of or behind the vehicle part to which the assembly 10 is affixed. At least one fastener 22 is also used to connect each of the mounting portions 18 to the rigid portion 2 of the deflector panel 1. In a preferred embodiment, the rigid portion 2 includes a generally channel shaped portion 19 and the mounting portion 18 is secured to the channel.

The coupler link 5 includes at least two pairs of apertures through which two additional fasteners 24 extend, respectively, and each respective fastener 24 also extends through a corresponding end of the drive link 3 and follower link 4, e.g., through a cylindrical opening formed in the links 3, 4, thereby pivotably connecting the drive link 3 and follower link 4 to the coupler link 5. The fixed base link 6 also has at least one pair of apertures through which an additional fastener 24 extends, which fastener 24 also extends through a corresponding end of the follower link 4, thereby pivotably connecting the follower link 4 to the fixed base link 6.

The coupler link 5, drive link 3, follower link 4, and fixed base link 6 of the two four bar linkage assemblies 12, 14 are at predetermined suitable angles and ratios to each other to effectively move the deflector panel 1 between the deployed and retracted position. Most preferably, the angle "A" between the fixed base link 6 and drive link 3 in the deployed position is about 0 to 90 degrees. By way of non-limiting example, the fixed base link 6 is about 0.5 to 5 times the length of the coupler link 5; and/or the drive link 3 is about 1 to 6 times the length of the coupler link 5; and/or the follower link 4 is about 2 to 8 times the length of the coupler link 5.

The active front deflector assembly 10 is attached to the underside of the vehicle towards the front, e.g., using fasteners 20 extending through the attachment portion of the fixed base link 6. In the deployed position (generally down) the deflector panel 1 is in the air flow (see FIG. 5); the rigid part 2 is not in the air flow and is protected by the vehicle body 9. The deflector panel 1 interrupts the air flow thereby improving the vehicle aerodynamics. However, this deployed positioning reduces the vehicle ground clearance. When the vehicle needs its full ground clearance capabilities the deflector panel 1 is retracted (generally up) (e.g., see FIG. 6).

At least the drive link 3 and follower link 4 have strengthening features, e.g., such as trusses 30 and/or other suitable structure to add strength while minimizing weight, along its length from one joint area to the other joint area of the links.

One of the linkage assemblies 12, 14 e.g., the left hand four bar linkage 12, also has an actuator 26. The linkage assemblies 12, 14 are connected to the deflector panel 1,2 and to a drive shaft 28 which is coupled to the actuator 26.

The linkage assemblies 12, 14 are joined by the deflector 1, 2 (via coupler link 5 of both linkages 12, 14) and the drive shaft 28. Retraction and deployment of the active front deflector assembly 10 is achieved by the actuator 26.

The actuator 26 is attached to the drive shaft 28 which is attached toward the ends of the drive links 3 of both linkage assemblies 12, 14. The drive shaft 28 also extends through apertures formed in both fixed base links 6 adjacent to corresponding ends of the drive links 3. In operation the actuator 26 rotates the drive shaft 28 which rotates the drive links 3 upward causing the follower 4 and coupler links 5 up and the deflector panel 1 to rise and fold back out of the air flow (e.g., FIG. 6) to the retracted position. The actuator 26 rotates the drive shaft 28 in the opposite direction to rotate the drive links 3 downward causing the follower 4 and coupler links 5 down and the deflector panel 1 to lower and extend into the air flow (e.g., FIG. 5) to the deployed position.

The linkage assemblies 12, 14 are critical to the motion of the deflector panel 1 and has significant advantages over conventional systems. Further, the actuator 26 is clutched to prevent damage to the system, which is another significant advantage. The drive shaft 28 transmits the drive from the left side to the right side, or vice versa. The deflector 1, 2 is both rigid and semi-rigid to absorb impact energy, which is yet another significant advantage.

The actuator 26 is a rotary actuator, e.g., with feedback options, hex-type, screw-type drive, higher speed actuator, electric, mechanical, linear, e.g., with current override circuits, declutching, hydraulic, pneumatic, extending, power lift actuator, or any other actuator and combinations thereof depending on the application and predetermined vehicle needs.

In the event that an object strikes the deflector panel 1 in the deployed position the system is designed to absorb the energy, but if the impact exceeds a predetermined set level it is released by the actuators 26 internal clutch allowing it to move with the impact preventing damage to the system.

In a preferred embodiment, the actuator 26 has internal clutching that de-clutches or disengages gears allowing the deflector panel 1 to rotate or move out of the way under a predetermined condition to help prevent damage to the active front deflector assembly 10. By way of example, upon impact of a predetermined force to the deflector panel 1 the actuator 26 will clutch to disengage the gearing so that the deflector panel 1 can move freely out of the way.

The clutchable actuator 26 is sealed and has communication capability with the vehicle 16. The actuator 26 and the vehicle 16 also communicate to deploy and retract the deflector panel 1 based upon predetermined conditions such as vehicle speed, wind direction, yaw, etc, and combinations thereof. By way of non-limiting example, the deflector panel 1 is retracted until the vehicle reaches a predetermined speed, e.g., about 30-40 mph, then the deflector panel 1 is extended and stays deployed until the vehicle drops back down to below the predetermined speed or other predetermined conditions for continued deployment are no longer met.

When the deflector panel 1 is in the fully deployed position it extends to about 90°. Accordingly, the deflector panel 1 extends generally vertically along the vehicle 16 front to prevent air from ducking under and swirling under the vehicle 16 where it is turbulent due to all of the components under the vehicle 16, and reduces drag. The deflector panel 1 generally follows the curvature of the front end of the vehicle and/or can be scooped or concaved or other suitable shape/profile to further direct air flow. When the deflector panel 1 is down in the deployed position it is extended generally about one quarter to one half of the distance to the traversed ground surface, preferably, about one third of the distance.

The deflector panel 1 is made of a composite plastic in this particular embodiment. However, it is also within the scope of the invention to manufacture the deflector panel 1 of different materials such as steel or aluminum (depending on the particular application), painted carbon fiber, extruded rubber, or other suitable impact resistant material to withstand a predetermined load without departing from the scope of the invention. Additionally, the deflector panel 1 may consist of a single piece, e.g., of molded composite plastic, or multiple pieces assembled or molded together.

Referring generally to FIGS. 7-10, the actuator 26, utilizable in any embodiment described herein, can be declutchable. An exemplary actuator assembly with internal clutching is shown generally at 310, comprising a clutch system, generally shown at 312. At least one actuator 310 with internal clutching is used or other actuator and/or in combination with any additional actuator(s) is/are used in the system. Generally, there is provided a sealed actuator with internal clutching assembly in accordance with the present invention which provides desirable higher cycle durability and capability combined with a water tight arrangement for use, by way of example, in underbody environments exposed to the elements. The sealed actuator with internal clutching assembly further provides a safety override clutch system which allows the actuator to rotate under predetermined conditions, e.g., predetermined high loads, to help protect a motor and other components of the actuator with internal clutching assembly, as will be explained in greater detail below. When subjected to abnormal loads or a predetermined amount of force or other predetermined conditions, the actuator with internal clutching assembly will move features out of the way to help prevent damage thereto.

The clutch system 312 comprises a housing portion indicated generally at 312, an output shaft 316 which is received within and holds an output detent ring 318 and a moving detent ring 320.

During normal operation of the active front deflector assembly 10, 100, 200, the actuator assembly 310 provides power to drive and move the at least one deflector panel 1 between at least the stowed position and deployed position. Also connected to the actuator assembly 310 is a rotatable drive shaft, e.g., drive shaft 28, that is operably connected to the deflector panel 1 and the output shaft 316 of the actuator assembly 310. The drive shaft 28 functions to deploy the deflector panel 1 in the event of predetermined conditions sensed by the actuator assembly 310 in order to move the panel 1 to a fully extended deployed position for improved aerodynamics.

The output detent ring 318 is free to rotate on the output shaft 316 about a portion of the output shaft 316 that is not splined. The moving detent ring 320 is able to move axially to the output shaft 316 but is locked radially by a plurality of interlocking splines 322, 324 on both components. The output shaft 316 has interlocking splines 322 that are arranged parallel to the longitudinal axis and operably spaced about an outer surface located on a lower half of the output shaft 316. The moving detent ring 320 has outer interlocking splines 324 forming complementary channels to slidably interlock with the interlocking splines 322 for controlled axial movement of the moving detent ring 320. The interlocking splines 322 of the output shaft 316 terminate at an integrally formed projecting ring 326 having an abutting surface 328, lying transverse to the axis, against which the output detent ring 318 engages. The output detent ring 318 abuts against this surface 328 on the output shaft 316 and does not move axially.

An output gear 330 is in mesh with the output detent ring 318 for transmitting torque. The output gear 330 has spaced circumferential segments 332 that are generally square teeth like shaped held in place within opposing recesses 334 of the output detent ring 318 for transmitting the torque.

The output and moving detent rings 318, 320 have first and second intermeshing ramped teeth, generally shown at 336, 338, respectively, that are held together in mesh by the biasing force of a wave spring 340. The wave spring 340 is received on the outer output shaft 316 and provides a biasing force against the moving detent ring 320 in the direction of the output detent ring 318.

The components of the clutch system 310 (e.g., output shaft 316, output gear 330, output detent ring 318, moving detent ring 320, and wave spring 340) are held together by first and second locking rings 342, 344 located toward respective ends the output shaft 316 of the clutch assembly 312.

A motor 346 selectively provides torque suitable for particular applications. Suitable electronics 348, most preferably, a shut off printed circuit board (PCB) with connector contacts 350 correlate with vehicle communication networks for commanding the motor 346 based upon predetermined conditions, e.g., commanding energizing of the motor correlating with predetermined vehicle speed ranges. The PCB electronics senses current spike for override, which allows the clutch to disengage the drive system allowing it to rotate freely.

The motor 346 has a worm gear, shown generally at 352, which causes a main gear, shown generally at 354, to rotate. The main gear 354 has a gear and a helix angle portion 358. The worm gear 352 has a shaft, e.g., a threaded shaft, which engages the teeth of the gear 356, which causes the gear 356 of the main gear 354 to rotate as the worm gear 352 rotates. Rotation of the gear 356 causes the helix angle portion 358 of the main gear 354 to also rotate. The helix angle portion 358 rotatably engages the output gear 330. The gear ratio range of the gear 356 to helix angle portion 358 is operably suitable for transmitting torque from the motor/worm gear 346/352 to the output gear 330. The first and second intermeshing ramped teeth 336, 338 of the output and moving detent rings 318, 320 when held together by the biasing force of the wave spring 340 lock and allow the output shaft 316 to rotate and transmit the torque of the motor 346 through the main gear 354 and output gear 330 to the outside of the housing portion 314. The output shaft 330 is operably coupled to the drive shaft 28 for selectively rotating, folding or otherwise moving the panel 1, etc between at least the stowed position and the deployed position. The wave spring 340 allows for a more compact structure while meeting biasing and predetermined load requirements.

The housing portion 314 comprises a first half 360 and a second half 362. The first half 360 has a first clutch assembly cavity 364 and a first motor cavity 366. The second half 362 has a second clutch assembly cavity 368, a main gear cavity 370, and a second motor cavity. The clutch system 312 fits fully inside the first and second halves 360, 362 of the housing (within the first and second clutch assembly cavities 364, 368), as well as the motor 346 and electronics 348/350 (within the first motor cavity 366 and second motor cavity), and main gear 354 (within the main gear cavity 370). The first and second halves 360, 362 of the housing portion 314 are joined together, and connected with fasteners, and first and second seals added 372, 374 onto the output shaft 316 to form a weathertight housing. The housing 314 may be formed in the rocker panel module 14, etc. without departing from the scope of the invention.

In operation, the first and second intermeshing ramped teeth 336, 338 of the output and moving detent rings 318, 320, that when held together by the biasing force of the wave spring 340, lock together and allow the output shaft 316 to rotate. This allows torque transmission from the motor 346/worm gear 352 through the main gear 354 and output gear 330 to the outside of the housing portion 314 via the output shaft 316 to the drive shaft 28. During a predetermined level of high load, the first and second intermeshing ramped teeth 336, 338 create an axile force that overcomes the load from the wave spring 340. This allows the moving detent ring 320 to disengage and allow the output shaft 316 to rotate freely, thereby preventing damage to the sealed actuator internal clutching assembly 310.

Thus, there is provided a sealed actuator with internal clutching assembly 310 which can drive in both directions, but when stopped will hold its position without back driving when subjected to a predetermined load, e.g., a load many times greater than its dynamic range. The actuator 310 also protects itself from damage from predetermined loads, e.g., very high loads, by means of the clutch that will disengage the drive system allowing it to rotate (e.g., allowing the output shaft 316 to rotate freely). The sealed actuator with internal clutching assembly 310 is in a waterproof housing and can rotate in both directions for as many revolutions as needed. The clutch is fully self contained in the housing. The actuator has an output passthrough drive structure, e.g., output shaft 316 arrangement, allowing it to drive a shaft, e.g., drive shaft 28, or part from either side or both sides. The actuator 310 can be mounted to a fixed part, e.g., fixed base link 6, with the only external moving part being the drive shaft 28. The clutch system 312 of the sealed actuator with internal clutching assembly 310 also does not change shape or height when it clutches, which is yet another significant advantage.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A linkage assembly for a vehicle, comprising:
   a coupler link;
   a fixed base link, where the fixed base link is attached to the vehicle;
   a drive link pivotably connected to the coupler link and fixed base link, wherein the drive link and the follower link have trusses to add strength while minimizing weight;
   a follower link pivotably connected to the coupler link and fixed base link below the drive link;
   wherein the coupler link, drive link, follower link, and fixed base link are at predetermined angles and ratios to each other to move the coupler link between the deployed and retracted position; and
   an actuator operably coupled to the drive link by a drive shaft, where the actuator is in communication with the vehicle and deploys and retracts the linkage assembly under predetermined conditions.

2. The linkage assembly of claim 1, wherein the actuator further comprises a printed circuit board with connector contacts to correlate with vehicle communication networks for commanding operation of a motor of the actuator based upon predetermined conditions.

3. The linkage assembly of claim 2, wherein the predetermined conditions are selected from the group consisting of vehicle speed, wind direction, yaw, and combinations thereof.

4. The linkage assembly of claim 3, wherein one of the predetermined conditions for deploying the coupler link is vehicle speed in the range of at least 30 miles per hour.

5. The linkage assembly of claim 1, wherein one of the predetermined conditions for retracting the coupler link is vehicle speed in the range of less than 30 miles per hour and/or when the actuator senses higher than desired predetermined loads.

6. The linkage assembly of claim 1, wherein the actuator further comprises printed circuit board electronics that sense current spike for circuit override, which allows a clutch system in the actuator to disengage a drive system.

7. The linkage assembly of claim 6, wherein the actuator has declutching of gearing so that the linkage assembly can move freely out of the way to prevent damage.

8. The linkage assembly of claim 1, wherein rotation of the drive shaft rotates the drive link upward causing the follower link to move upward and the coupler link moves upward and back to the retracted position, and wherein rotation of the drive shaft in the opposite direction rotates the drive link downward causing the follower link to move downward and the coupler link to move downward to a point lower and extend into the deployed position.

9. The linkage assembly of claim 1, wherein the coupler link has a mounting portion for receiving at least one fastener.

10. The linkage assembly of claim 1, wherein an angle between the fixed base link and drive link in the deployed position is about 0 to 90 degrees.

11. The linkage assembly of claim 1, wherein
the fixed base link is about 0.5 to 5 times the length of the coupler link; and/or
the drive link is about 1 to 6 times the length of the coupler link; and/or
the follower link is about 2 to 8 times the length of the coupler link.

12. A linkage assembly for a vehicle, comprising:
a coupler link;
a fixed base link, where the fixed base link is attached to the vehicle;
a drive link pivotably connected to the coupler link and fixed base link;
a follower link pivotably connected to the coupler link and fixed base link below the drive link;
wherein the coupler link, drive link, follower link, and fixed base link are at predetermined angles and ratios to each other to move the coupler link between the deployed and retracted position; and
an actuator operably coupled to the drive link by a drive shaft, where the actuator is in communication with the vehicle and deploys and retracts the linkage assembly under predetermined conditions, wherein the actuator includes a clutch system in the actuator to disengage a drive system by declutching of gearing in the actuator so that the linkage system can move freely out of the way to prevent damage;
wherein the actuator further includes a printed circuit board with connector contacts to correlate with vehicle communication networks for commanding operation of a motor of the actuator based upon predetermined conditions selected from the group consisting of vehicle speed, wind direction, yaw, and combinations thereof.

13. The linkage assembly of claim 12, wherein the drive link and the follower link have trusses to add strength while minimizing weight.

14. The linkage assembly of claim 12, wherein one of the predetermined conditions for deploying the coupler link is vehicle speed in the range of at least 30 miles per hour.

15. The linkage assembly of claim 14, wherein a second one of the predetermined conditions for retracting the coupler link is when the actuator senses higher than desired predetermined loads.

16. The linkage assembly of claim 12, wherein rotation of the drive shaft rotates the drive link upward causing the follower link to move upward and the coupler link moves upward and back to the retracted position, and wherein rotation of the drive shaft in the opposite direction rotates the drive link downward causing the follower link to move downward and the coupler link to move downward to a point lower and extend into the deployed position.

17. The linkage assembly of claim 12, wherein the coupler link has a mounting portion for receiving at least one fastener.

18. The linkage assembly of claim 12, wherein an angle between the fixed base link and drive link in the deployed position is about 0 to 90 degrees.

19. A linkage assembly for a vehicle, comprising:
a coupler link;
a fixed base link, where the fixed base link is attached to the vehicle;
a drive link pivotably connected to the coupler link and fixed base link;
a follower link pivotably connected to the coupler link and fixed base link below the drive link;
wherein the coupler link, drive link, follower link, and fixed base link are at predetermined angles and ratios to each other to move the coupler link between the deployed and retracted position; and
an actuator operably coupled to the drive link by a drive shaft, where the actuator is in communication with the vehicle and deploys and retracts the linkage assembly under predetermined conditions, wherein the actuator includes a clutch system in the actuator to disengage a drive system by declutching of gearing in the actuator so that the linkage system can move freely out of the way to prevent damage
wherein the fixed base link is about 0.5 to 5 times the length of the coupler link, the drive link is about 1 to 6 times the length of the coupler link, the follower link is about 2 to 8 times the length of the coupler link.

20. The linkage assembly of claim 19, wherein the drive link and the follower link have trusses to add strength while minimizing weight.

21. The linkage assembly of claim 19, wherein the actuator further comprises a printed circuit board with connector contacts to correlate with vehicle communication networks for commanding operation of a motor of the actuator based upon predetermined conditions.

22. The linkage assembly of claim 21, wherein the predetermined conditions are selected from the group consisting of vehicle speed, wind direction, yaw, and combinations thereof.

23. The linkage assembly of claim 22, wherein one of the predetermined conditions for deploying the coupler link is vehicle speed in the range of at least 30 miles per hour.

24. The linkage assembly of claim 23, wherein one of the predetermined conditions for retracting the coupler link is vehicle speed in the range of less than 30 miles per hour and/or when the actuator senses higher than desired predetermined loads.

25. The linkage assembly of claim 19, wherein rotation of the drive shaft rotates the drive link upward causing the follower link to move upward and the coupler link moves upward and back to the retracted position, and wherein rotation of the drive shaft in the opposite direction rotates the drive link downward causing the follower link to move downward and the coupler link to move downward to a point lower and extend into the deployed position.

26. The linkage assembly of claim 19, wherein the coupler link has a mounting portion for receiving at least one fastener.

27. The linkage assembly of claim 19, wherein an angle between the fixed base link and drive link in the deployed position is about 0 to 90 degrees.

28. A linkage assembly for a vehicle, comprising:
a coupler link;
a fixed base link, where the fixed base link is attached to the vehicle;
a drive link pivotably connected to the coupler link and fixed base link;
a follower link pivotably connected to the coupler link and fixed base link below the drive link;
wherein the coupler link, drive link, follower link, and fixed base link are at predetermined angles and ratios to each other to move the coupler link between the deployed and retracted position;
an actuator operably coupled to the drive link by a drive shaft, where the actuator is in communication with the vehicle and deploys and retracts the linkage assembly under predetermined conditions; and
wherein the fixed base link is about 0.5 to 5 times the length of the coupler link and/or wherein the drive link is about 1 to 6 times the length of the coupler link and/or wherein the follower link is about 2 to 8 times the length of the coupler link.

29. The linkage assembly of claim 28, wherein the drive link and the follower link have trusses to add strength while minimizing weight.

30. The linkage assembly of claim 28, wherein the actuator further comprises a printed circuit board with connector contacts to correlate with vehicle communication networks for commanding operation of a motor of the actuator based upon predetermined conditions.

31. The linkage assembly of claim 30, wherein the predetermined conditions are selected from the group consisting of vehicle speed, wind direction, yaw, and combinations thereof.

32. The linkage assembly of claim 31, wherein one of the predetermined conditions for deploying the coupler link is vehicle speed in the range of at least 30 miles per hour.

33. The linkage assembly of claim 28, wherein one of the predetermined conditions for retracting the coupler link is vehicle speed in the range of less than 30 miles per hour and/or when the actuator senses higher than desired predetermined loads.

34. The linkage assembly of claim 28, wherein the actuator further comprises printed circuit board electronics that sense current spike for circuit override, which allows a clutch system in the actuator to disengage a drive system.

35. The linkage assembly of claim 34, wherein the actuator has declutching of gearing so that the linkage assembly can move freely out of the way to prevent damage.

36. The linkage assembly of claim 28, wherein rotation of the drive shaft rotates the drive link upward causing the follower link to move upward and the coupler link moves upward and back to the retracted position, and wherein rotation of the drive shaft in the opposite direction rotates the drive link downward causing the follower link to move downward and the coupler link to move downward to a point lower and extend into the deployed position.

37. The linkage assembly of claim 28, wherein the coupler link has a mounting portion for receiving at least one fastener.

38. The linkage assembly of claim 28, wherein an angle between the fixed base link and drive link in the deployed position is about 0 to 90 degrees.

39. A linkage assembly for a vehicle, comprising:
a coupler link;
a fixed base link, where the fixed base link is attached to the vehicle;
a drive link pivotably connected to the coupler link and fixed base link;
a follower link pivotably connected to the coupler link and fixed base link below the drive link;
wherein the coupler link, drive link, follower link, and fixed base link are at predetermined angles and ratios to each other to move the coupler link between the deployed and retracted position; and
an actuator operably coupled to the drive link by a drive shaft, where the actuator is in communication with the vehicle and deploys and retracts the linkage assembly under predetermined conditions wherein one of the predetermined conditions for deploying the coupler link is vehicle speed in the range of at least 30 miles per hour.

40. The linkage assembly of claim 39, wherein the drive link and the follower link have trusses to add strength while minimizing weight.

41. The linkage assembly of claim 39, wherein the actuator further comprises a printed circuit board with connector contacts to correlate with vehicle communication networks for commanding operation of a motor of the actuator based upon predetermined conditions.

42. The linkage assembly of claim 41, wherein the predetermined conditions are selected from the group consisting of vehicle speed, wind direction, yaw, and combinations thereof.

43. The linkage assembly of claim 39, wherein the actuator further comprises printed circuit board electronics that sense current spike for circuit override, which allows a clutch system in the actuator to disengage a drive system.

44. The linkage assembly of claim 43, wherein the actuator has declutching of gearing so that the linkage assembly can move freely out of the way to prevent damage.

45. The linkage assembly of claim 39, wherein rotation of the drive shaft rotates the drive link upward causing the follower link to move upward and the coupler link moves upward and back to the retracted position, and wherein rotation of the drive shaft in the opposite direction rotates the drive link downward causing the follower link to move downward and the coupler link to move downward to a point lower and extend into the deployed position.

46. The linkage assembly of claim 39, wherein the coupler link has a mounting portion for receiving at least one fastener.

47. The linkage assembly of claim 39, wherein an angle between the fixed base link and drive link in the deployed position is about 0 to 90 degrees.

48. The linkage assembly of claim 39, wherein
the fixed base link is about 0.5 to 5 times the length of the coupler link; and/or
the drive link is about 1 to 6 times the length of the coupler link; and/or
the follower link is about 2 to 8 times the length of the coupler link.

49. A linkage assembly for a vehicle, comprising:
a coupler link;
a fixed base link, where the fixed base link is attached to the vehicle;
a drive link pivotably connected to the coupler link and fixed base link;
a follower link pivotably connected to the coupler link and fixed base link below the drive link;
wherein the coupler link, drive link, follower link, and fixed base link are at predetermined angles and ratios to each other to move the coupler link between the deployed and retracted position; and
an actuator operably coupled to the drive link by a drive shaft, where the actuator is in communication with the vehicle and deploys and retracts the linkage assembly under predetermined conditions wherein one of the predetermined conditions for deploying the coupler link is vehicle speed in the range of at least 30 miles per hour and another one of the predetermined conditions are selected from the group consisting of wind direction, yaw, and combinations thereof.

50. The linkage assembly of claim 49, wherein the drive link and the follower link have trusses to add strength while minimizing weight.

51. The linkage assembly of claim 49, wherein the actuator further comprises a printed circuit board with connector contacts to correlate with vehicle communication networks for commanding operation of a motor of the actuator based upon predetermined conditions.

52. The linkage assembly of claim 49, wherein one of the predetermined conditions for retracting the coupler link is vehicle speed in the range of less than 30 miles per hour and/or when the actuator senses higher than desired predetermined loads.

53. The linkage assembly of claim 49, wherein the actuator further comprises printed circuit board electronics that sense current spike for circuit override, which allows a clutch system in the actuator to disengage a drive system.

54. The linkage assembly of claim 53, wherein the actuator has declutching of gearing so that the linkage assembly can move freely out of the way to prevent damage.

55. The linkage assembly of claim 49, wherein rotation of the drive shaft rotates the drive link upward causing the follower link to move upward and the coupler link moves upward and back to the retracted position, and wherein rotation of the drive shaft in the opposite direction rotates the drive link downward causing the follower link to move downward and the coupler link to move downward to a point lower and extend into the deployed position.

56. The linkage assembly of claim 49, wherein the coupler link has a mounting portion for receiving at least one fastener.

57. The linkage assembly of claim 49, wherein an angle between the fixed base link and drive link in the deployed position is about 0 to 90 degrees.

58. The linkage assembly of claim 49, wherein
the fixed base link is about 0.5 to 5 times the length of the coupler link; and/or
the drive link is about 1 to 6 times the length of the coupler link; and/or
the follower link is about 2 to 8 times the length of the coupler link.

* * * * *